United States Patent
Peterson (10) Patent No.: US 9,347,577 B2
(45) Date of Patent: May 24, 2016

(54) COMBINED THERMAL MANAGEMENT UNIT

(71) Applicant: Flextronics Automotive, Inc., Milpitas, CA (US)

(72) Inventor: Matthew Peterson, Ada, MI (US)

(73) Assignee: FLEXTRONICS AUTOMOTIVE, INC., Milpitas, CA (US)

( * ) Notice: Subject to any disclaimer, the term of this patent is extended or adjusted under 35 U.S.C. 154(b) by 68 days.

(21) Appl. No.: 14/314,842

(22) Filed: Jun. 25, 2014

(65) Prior Publication Data

US 2015/0059892 A1 Mar. 5, 2015

Related U.S. Application Data (60) Provisional application No. 61/872,178, filed on Aug. 30, 2013.

(51) Int. Cl.
*F16K 11/052* (2006.01)
*F16K 11/044* (2006.01)
(Continued)

(52) U.S. Cl.
CPC ............ *F16K 27/003* (2013.01); *F16K 11/044* (2013.01); *F16K 11/048* (2013.01); *F16K 11/052* (2013.01); *F16K 11/0743* (2013.01); *F16K 31/0603* (2013.01); *F16K 31/0624* (2013.01); *F16K 31/0627* (2013.01); *F16K 31/0634* (2013.01); *F16K 31/105* (2013.01); *H01F 7/121* (2013.01); *H01F 7/13* (2013.01); *H01F 7/1607* (2013.01); *H01F 7/1615* (2013.01); *Y10T 137/86895* (2015.04); *Y10T 137/87153* (2015.04); *Y10T 137/87812* (2015.04)

(58) Field of Classification Search
CPC ............ F16K 27/003; F16K 27/0281; F16K 31/0634; F16K 31/0624; F16K 31/0603; F16K 31/0627; F16K 31/105; F16K 11/0743; F16K 11/044; F16K 11/052; F16K 11/048; F16K 31/0617; F16K 11/10; Y10T 137/87772; Y10T 137/87708; Y10T 137/86879; Y10T 137/86855; Y10T 137/87153; Y10T 137/87812; Y10T 137/86847; Y10T 137/87531; Y10T 137/7753; Y10T 137/6048; Y10T 137/86895; Y10T 137/86887; F01P 7/14; F01P 2007/146; H01F 7/1607; H01F 7/121; H01F 7/13; H01F 7/1615; F16H 57/0413

See application file for complete search history.

(56) References Cited

U.S. PATENT DOCUMENTS 2,255,292 A * 9/1941 Lincoln ................. F24F 3/06
    137/269
2,512,189 A * 6/1950 Waterman ............. F01M 1/18
    137/115.26

(Continued)

FOREIGN PATENT DOCUMENTS

DE      195 40 580 A1    5/1997
DE   10 2005 038185 A1   2/2007

(Continued)

*Primary Examiner* — Kevin Murphy
*Assistant Examiner* — David Colon Morales
(74) *Attorney, Agent, or Firm* — Volpe and Koenig, P.C.

(57) ABSTRACT

A combination thermal management valve for management of the flow of heat transfer media is provided. The thermal management valve includes a manifold including two or more independently controlled valve assemblies configured to fluidly isolate the heat transfer media from each other. The valve assemblies may be configured to maintain desirable flow characteristics for each thermal medium.

17 Claims, 10 Drawing Sheets

(51) Int. Cl.
*F16K 31/10* (2006.01)
*F16K 27/00* (2006.01)
*F16K 11/048* (2006.01)
*F16K 11/074* (2006.01)
*F16K 31/06* (2006.01)
*H01F 7/121* (2006.01)
*H01F 7/13* (2006.01)
*H01F 7/16* (2006.01)

(56) References Cited

U.S. PATENT DOCUMENTS

| | | | | |
|---|---|---|---|---|
| 2,522,249 A * | 9/1950 | Baker | F01P 7/16 | 137/597 |
| 2,790,605 A * | 4/1957 | Peterson | B60H 1/00485 | 163/625.48 |
| 2,874,929 A * | 2/1959 | Klingler | F16K 1/14 | 137/625.44 |
| 2,912,012 A * | 11/1959 | Klingler | F16K 11/052 | 137/625.44 |
| 2,934,090 A * | 4/1960 | Kenann | F16K 11/044 | 137/312 |
| 3,211,374 A * | 10/1965 | Matulaitis | F01P 7/16 | 237/12.3 R |
| 3,329,165 A * | 7/1967 | Lang | F15B 13/0405 | 137/625.5 |
| 3,351,128 A * | 11/1967 | Barnd | F24F 11/06 | 165/219 |
| 3,525,364 A * | 8/1970 | Esche | F16K 11/048 | 137/625.65 |
| 3,940,222 A * | 2/1976 | Zink | B01D 35/12 | D35/12 |
| 3,974,998 A * | 8/1976 | Wood | B05B 1/3013 | 137/594 |
| 3,989,063 A * | 11/1976 | Brouwers | B60T 8/364 | 137/596.17 |
| 4,078,579 A * | 3/1978 | Bucko, Sr. | F16K 11/0655 | 137/625.48 |
| 4,193,423 A * | 3/1980 | Stoll | F15B 13/0402 | 137/625.5 |
| 4,285,497 A * | 8/1981 | Gottel | F16K 31/105 | 137/625.44 |
| 4,641,686 A * | 2/1987 | Thompson | F16K 11/044 | 137/625.65 |
| 4,807,665 A * | 2/1989 | Schiel | F16K 11/0525 | 137/625.4 |
| 4,852,612 A * | 8/1989 | Bucko, Sr. | F16K 11/044 | 137/625.5 |
| 4,874,010 A * | 10/1989 | DeJong | B60H 1/00485 | 137/110 |
| 5,184,773 A * | 2/1993 | Everingham | B60H 1/00485 | 137/115.25 |
| 5,265,547 A * | 11/1993 | Daws | A01C 7/087 | 111/175 |
| 5,443,241 A * | 8/1995 | Odaira | F01P 7/14 | 137/625.5 |
| 5,456,286 A * | 10/1995 | Warner | F16J 15/162 | 137/594 |
| 5,799,696 A * | 9/1998 | Weiss | F16K 11/052 | 137/625.44 |
| 5,809,944 A * | 9/1998 | Aoki | B60H 1/00878 | 123/41.02 |
| 5,944,053 A * | 8/1999 | Kabierschke | B60H 1/00485 | 137/625.29 |
| 5,950,576 A * | 9/1999 | Busato | F01P 7/16 | 123/41.08 |
| 5,979,484 A * | 11/1999 | Grando | F23N 1/005 | 137/66 |
| 6,019,120 A | 2/2000 | Najmolhoda et al. | | |
| 6,109,300 A | 8/2000 | Najmolhoda | | |
| 6,109,301 A * | 8/2000 | Pfetzer | B60H 1/00485 | 137/599.14 |
| 6,109,302 A * | 8/2000 | Bircann | F16K 11/044 | 137/625.5 |
| 6,196,167 B1 * | 3/2001 | Marsh | F01P 7/14 | 123/41.09 |
| 6,588,442 B2 * | 7/2003 | Babin | B60H 1/00485 | 137/1 |
| 6,644,352 B1 * | 11/2003 | Pfetzer | B60H 1/00485 | 137/625.44 |
| 6,712,093 B2 * | 3/2004 | Hess | F16K 11/048 | 137/625.29 |
| 6,814,102 B2 * | 11/2004 | Hess | F16K 1/44 | 137/315.09 |
| 6,830,067 B2 * | 12/2004 | Hayashi | F15B 13/0814 | 137/554 |
| 6,955,141 B2 * | 10/2005 | Santanam | F01P 7/165 | 123/41.08 |
| 6,955,188 B2 * | 10/2005 | Heckt | F01N 3/031 | 137/87.01 |
| 7,182,101 B2 * | 2/2007 | Alacqua | F03G 7/065 | 137/875 |
| 7,216,697 B2 * | 5/2007 | Odeskog | B60H 1/00314 | 165/202 |
| 7,534,074 B2 * | 5/2009 | Kato | B65G 53/56 | 137/875 |
| 8,127,791 B2 | 3/2012 | Najmolhoda et al. | | |
| 8,162,004 B2 * | 4/2012 | Albert | F02M 25/0719 | 137/340 |
| 2002/0084068 A1 * | 7/2002 | Hugger | F16K 11/044 | 165/284 |
| 2003/0150498 A1 | 8/2003 | Williams | | |
| 2003/0217775 A1 * | 11/2003 | Cousineau | F01P 7/16 | 137/625.4 |
| 2004/0182455 A1 * | 9/2004 | Wells | F16K 11/207 | 137/594 |
| 2009/0114865 A1 | 5/2009 | Homann et al. | | |
| 2011/0024513 A1 * | 2/2011 | Davidson | F16K 11/044 | 236/12.1 |
| 2011/0073285 A1 * | 3/2011 | Benoit | F01P 7/165 | 165/104.28 |
| 2011/0132483 A1 * | 6/2011 | Kim | F01P 7/14 | 137/625 |
| 2012/0048411 A1 * | 3/2012 | Steyer | F16K 11/0856 | 137/625 |

FOREIGN PATENT DOCUMENTS

| | | |
|---|---|---|
| DE | 20 2011 107875 U1 | 2/2012 |
| EP | 0 288 045 A2 | 10/1988 |
| EP | 1 801 477 A2 | 6/2007 |

* cited by examiner

COMBINED THERMAL MANAGEMENT UNIT

CROSS REFERENCE TO RELATED APPLICATIONS

This application claims the benefit of U.S. Patent Application No. 61/872,178 filed on Aug. 30, 2013 which is incorporated by reference as if fully set forth.

FIELD OF INVENTION

Embodiments of the present invention generally relate to combination valves for handling a variety of coolant media in one valve module.

BACKGROUND

Some thermal management systems employ more than one heat transfer medium to facilitate thermal control of different areas. For example, in an automobile, one heat transfer medium is used to facilitate thermal control of the engine and a separate heat transfer medium is used to facilitate thermal control of the transmission. The multiple media may have different thermal transfer characteristics and require different flow rates or pressures to effectively perform the intended function.

Currently, automobiles use one valve assembly to direct the flow of the engine heat transfer medium and a second valve assembly to direct the flow of the transmission heat transfer medium in response to the thermal response of the different systems. The increasing number of components to be placed in the engine compartment of some automobiles, the difficulty in routing conduit for thermal media, and the drive to reduce material and tooling costs are requiring, among other things, more space efficient thermal management valves.

Accordingly, a need exists for a combination thermal management valve performing the function of an engine thermal management valve and a transmission thermal management valve into a single housing.

SUMMARY

Embodiments of combination thermal management valves are provided herein. In some embodiments, a combination thermal management valve comprises a module having a first valve chamber comprising a first inlet in fluid communication with a first outlet via a passage and a second valve chamber, fluidly isolated from the first valve chamber, in fluid communication with a second inlet, a third inlet, and a second outlet.

A first valve assembly is disposed in the first valve chamber including a sealing disk disposed within the passage and supported for displacement between a first disk position that opens the inlet to fluid communication with the first outlet and a second disk position that closes the first inlet to fluid communication with the first outlet. A second valve assembly is disposed in the second valve chamber including a first sealing element movable between a first element position that closes the second inlet to fluid communication with the second outlet and a second element position that opens the second inlet to fluid communication with the second outlet.

Other and further embodiments of the present invention are described below.

BRIEF DESCRIPTION OF THE DRAWINGS

Embodiments of the present invention, briefly summarized above and discussed in greater detail below, can be understood by reference to the illustrative embodiments of the invention depicted in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common in the figures. The figures are not drawn to scale and may be simplified for clarity. It is contemplated that elements and features of one embodiment may be beneficially incorporated in other embodiments without further recitation.

While described in reference to an automobile thermal management valve, the present invention may be modified for a variety of applications while remaining within the spirit and scope of the claimed invention, since the range of the potential applications is great, and because it is intended that the present invention be adaptable to many such variations.

DETAILED DESCRIPTION

Embodiments of an inventive combination thermal management valve are provided herein. The thermal management valve is adapted to control the flow of two separate heat transfer media which may have different thermal transfer characteristics and may require different flow rates or pressures to effectively perform the intended function. For example, for one thermal management function a heat transfer media may be subject to a high flow rate and requires a minimum pressure drop across the valve. Another thermal management function may subject the heat transfer medium to a high pressure flow and tolerate a greater pressure drop across the valve.

Figure 1:
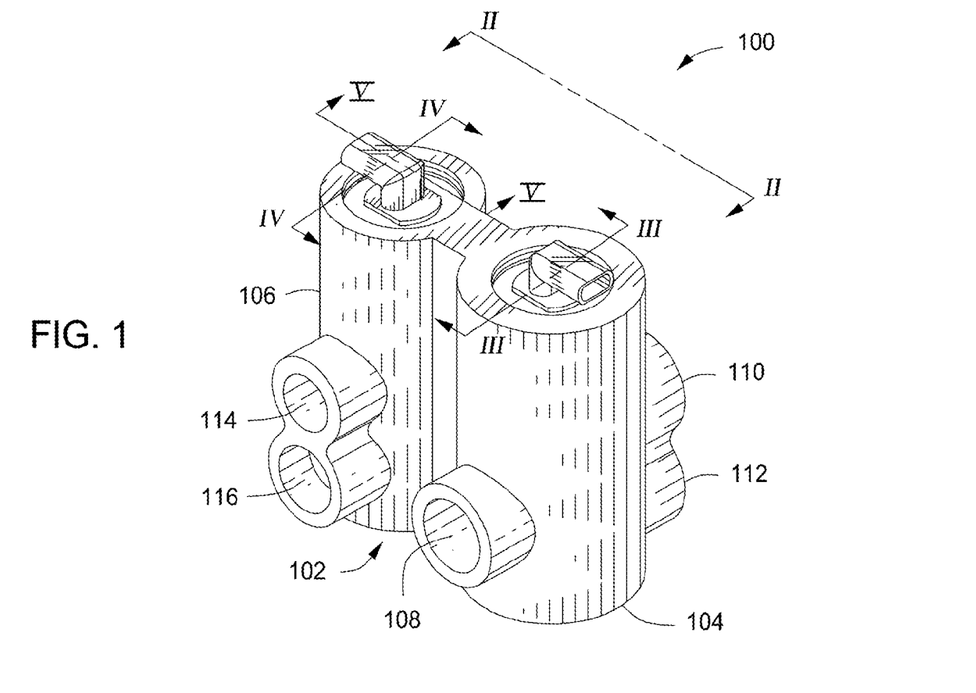
FIG. 1 is a perspective view of a combination thermal management valve in accordance with an embodiment of the present invention.
Figure 2:
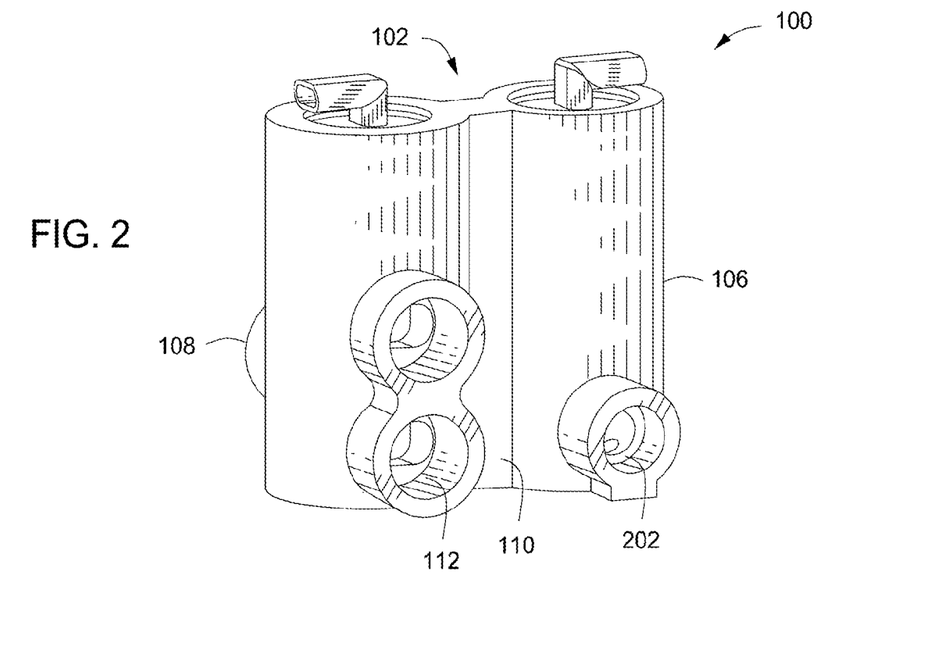
FIG. 2 is a perspective view of the combination thermal management valve of FIG. 1 taken along II-II.
Figure 3A:
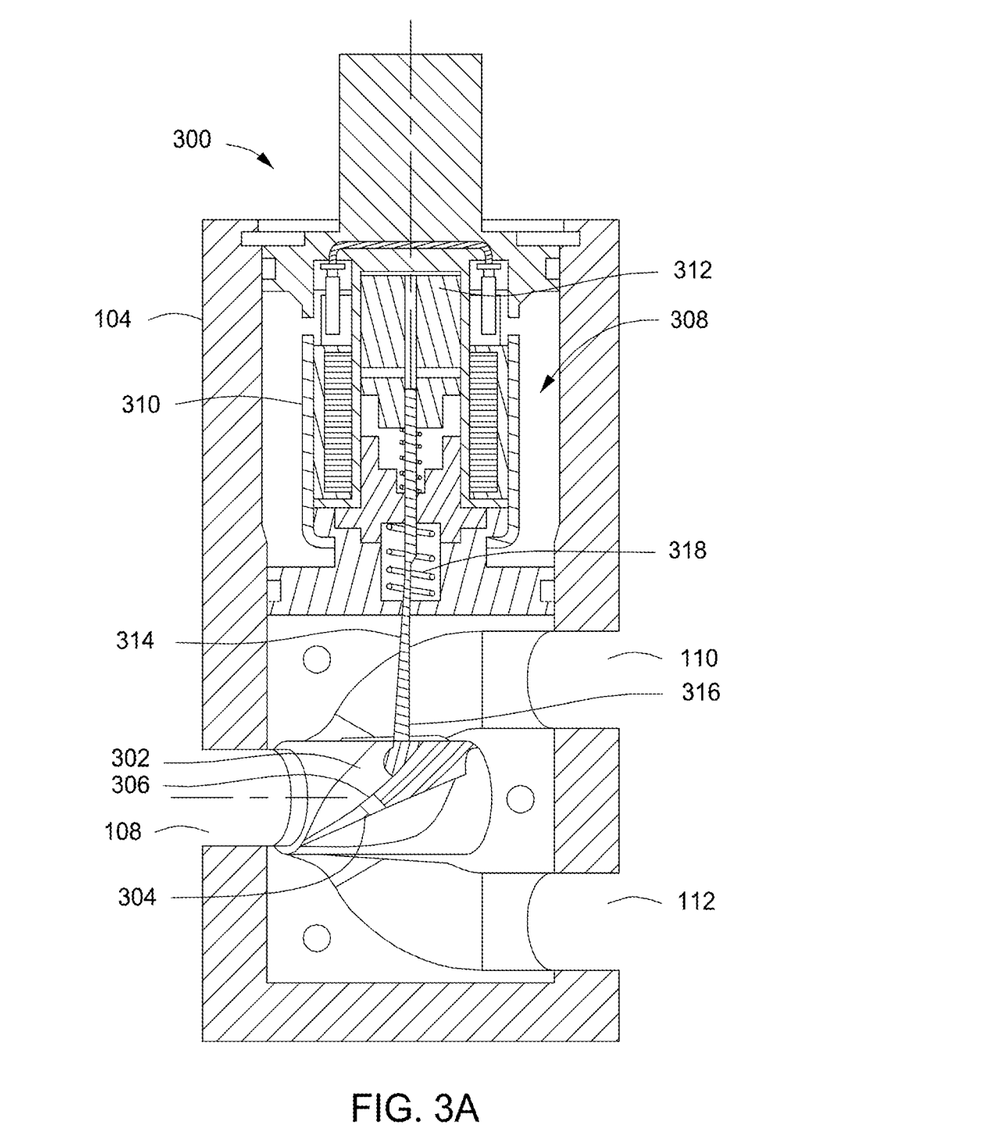
FIG. 3A is a sectional view of the combination thermal management valve of FIG. 1 taken along line III-III in a first position.

FIG. 1 depicts a combination thermal management valve 100 including a module 102. The module 102 may be formed from a metal or metal alloy or a polymer. In preferred embodiments, the module is formed from a polymer, for example a polyamide or a glass-filled polyamide, in an injection molding process, or a metal, for example cast aluminum. The module 102 includes a first valve chamber 104 integrally formed with a second valve chamber 106 which may be understood from the figures, for example FIGS. 1-4B, and the following description. First and second valve chambers 104, 106 are illustrated as each having a circular cross section connected by a radial web for ease of illustration only. Other shapes could be used with similar benefits, The first valve chamber 104 includes a first inlet 108 in controlled fluid communication with a first outlet 110 via a passage 302. In a preferred embodiment the first valve chamber 104 includes a third outlet 112 also in controlled fluid communication with the passage 302. In an embodiment, the first valve assembly 300 is disposed in the first valve chamber 104. The valve assembly 300 includes a valve disk 304 disposed within the passage 302 and supported for angular displacement about an axis 306 to selectively provide fluid communication between the first inlet 108 and the first outlet 110. Support for angular displacement may be provided by a separate shaft or by protrusions integrally formed with the valve disk 304. The valve disk 304 is selectively rotated to a first disk position as illustrated in FIG. 3A so that the first inlet 108 is at least partially open to fluid communication with first outlet 110. The valve disk 304 is selectively rotated to a second disk position as illustrated in FIG. 3B, wherein the first inlet 108 is blocked from fluid communication with the first outlet 110 by the valve disk 304.

Figure 3B:
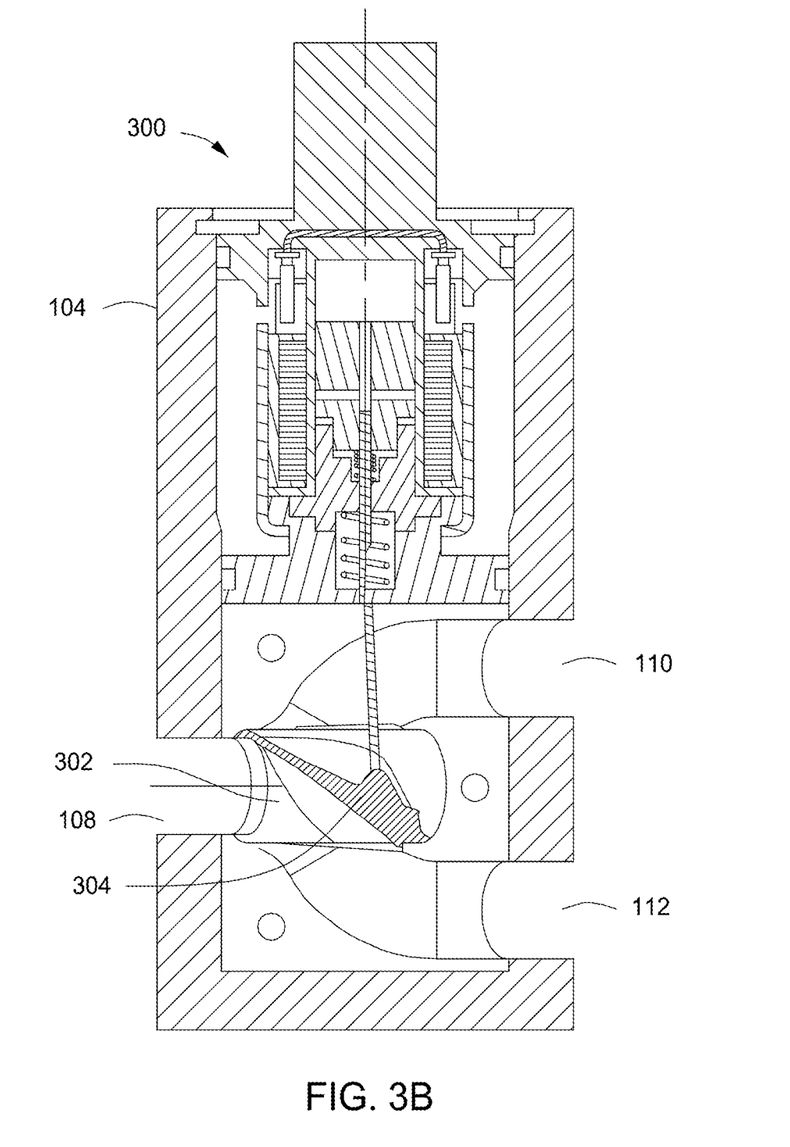
FIG. 3B is a sectional view of the combination thermal management valve of FIG. 1 taken along line III-III in a second position.

In the preferred embodiment including a third outlet 112, the first disk position closes the first inlet 108 to fluid communication with third outlet 112 as illustrated in FIG. 3A and the second disk position opens the first inlet 108 to fluid communication with the third outlet 112 as illustrated in FIG. 3B.

The valve disk 304 may be positioned in a third position (not shown) in which the valve disk 304 is oriented such that both the first outlet 110 and the third outlet 112 are in fluid communication with the first inlet 108 through the passage 302. The valve disk 304 may be positioned in any intermediate position between the first position of FIG. 3A and the second position of FIG. 3B to provide simultaneous fluid communication between first inlet 108, the first outlet 110, and third outlet 112.

The valve disk 304 is linked to a linear actuator, actuator 308, for example a solenoid 310. In the illustrated embodiment, the solenoid 310 has an armature 312 supported for linear displacement perpendicular to the axis of rotation 306 of the valve disk 304. The armature 312 may be directly linked to the valve disk 304 or may be linked via a linkage 314 comprising one or more segments (one shown in the figures, for example FIGS. 3A, 3B). A first end 316 of the linkage 314 is coupled to the valve disk 304 such that the first end 316 is supported for at least rotational displacement with respect to the valve disk 304. The linkage 314 is coupled to the valve disk at a location offset from the axis of rotation 302 so that the valve disk 304 rotates about the axis of rotation 302 in response to a linear displacement of the actuator 308.

In FIG. 3A, the valve disk 304 is illustrated in a first disk position which may correspond to a default condition. The default condition may correspond with a first energy condition of the actuator 308, for example a de-energized condition of the solenoid 310. In the de-energized position of FIG. 3A, a resilient member, for example spring 318, urges the linkage 314 in the upward direction as drawn to position the valve disk 304 in the illustrated orientation of FIG. 3A. In FIG. 3B, the valve disk 304 is illustrated in the second position which may correspond to a second energy condition of the actuator 308, for example an energized condition of the solenoid 310.

In the energized condition of FIG. 3B, the solenoid overcomes the upward (as drawn) urging of the resilient member 318 and displaces the linkage 314 downward, imparting a clockwise moment about the axis of rotation 306, to position the valve disk 304 in the orientation illustrated in FIG. 3B. A third position may be provided as discussed above in which the valve disk 304 is incrementally rotated to any third position between the first position and the second position. For example, in a third position (not shown), the valve disk 304 may rotated half way between the first position of FIG. 3A and the second position of FIG. 3B.

Figure 4A:
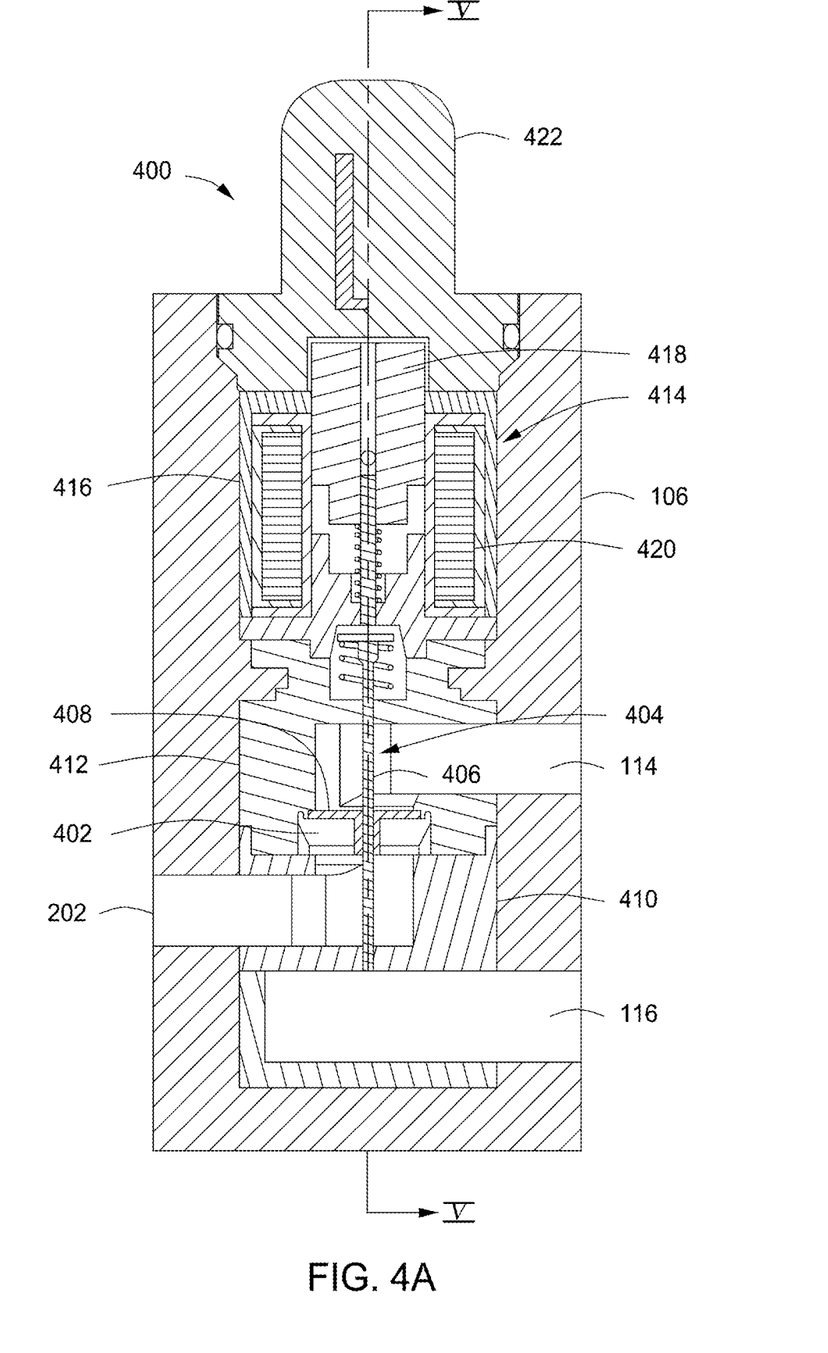
FIG. 4A is a sectional view of the combination thermal management valve of FIG. 1 taken along line IV-IV in a first position.
Figure 4B:
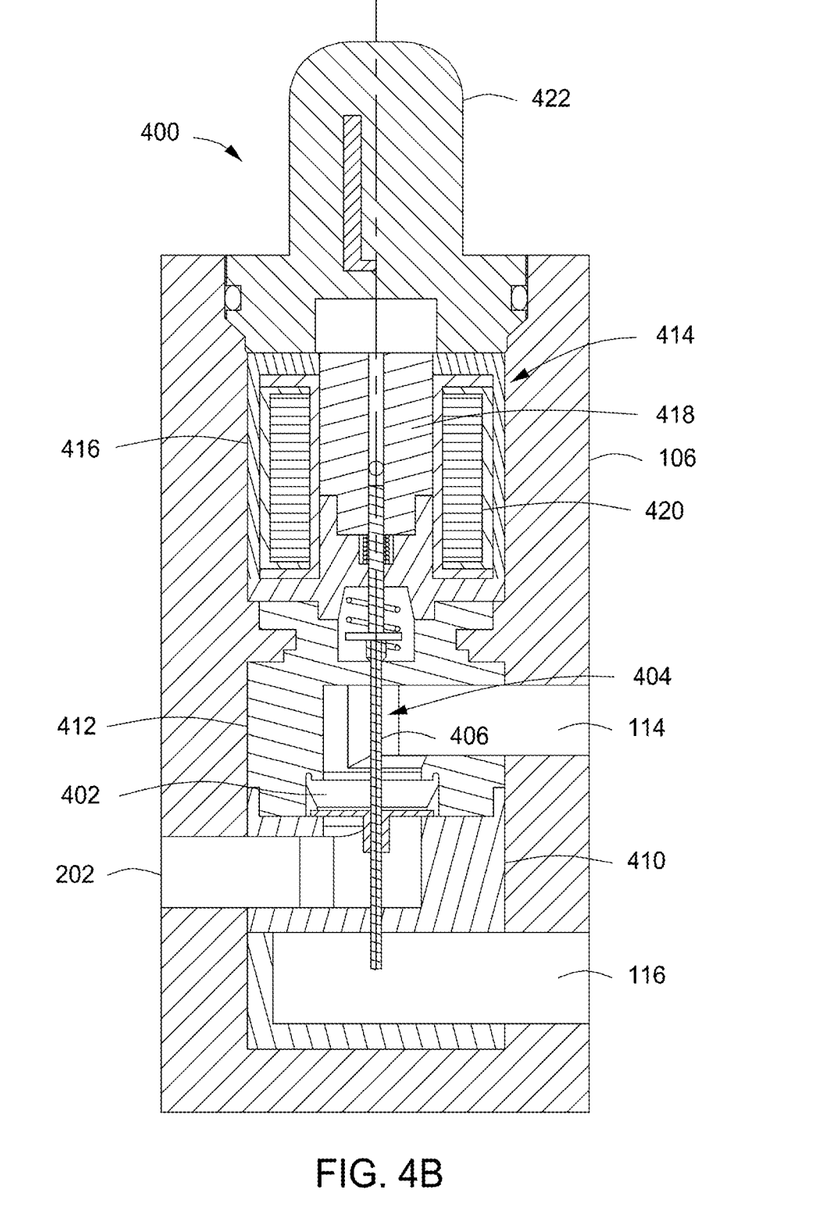
FIG. 4B is a sectional view of the combination thermal management valve of FIG. 1 taken along line IV-IV in a second position.

Returning to the non-limiting embodiment of FIGS. 1-4B, the module 102 includes a second valve chamber 106 fluidly isolated from the first valve chamber 104. The second valve chamber 106 includes a second inlet 114 and a third inlet 202, in controlled fluid communication with a second outlet 116 via a second passage 402. A second valve assembly 400 is disposed in the second valve chamber 106. The second valve assembly 400 includes a valve member 404 including a valve stem 406 and a first sealing element 408 disposed on a portion of the valve stem 406 disposed within a first valve body 410 and a second valve body 412 and supported for displacement between at least a first valve position (FIG. 4A) and a second valve position (FIG. 4B).

The first sealing element 408 is disposed within the second passage 402 and sized and shaped to selectably open or close the second inlet 114 and the third inlet 202 to fluid communication with the second outlet 116, thus providing selectable fluid communication between the second outlet 116 and the second or third inlet 114, 202, respectively. For ease of illustration only, the sealing element 408 is depicted as a disk having upper and lower flat surfaces to contact the valve bodies in FIGS. 4A, 4B. Other suitable shapes for the contact surfaces include, but are not limited to, conical and spherical surfaces.

As shown in FIGS. 4A, 4B the valve stem 406 is coupled to an actuator 414. In the non-limiting embodiment illustrated, the actuator 414 is a solenoid 416 having a movable armature 418 supported for linear displacement between at least the first position of FIG. 4A and a second position of FIG. 4B. The armature 418 is coupled to the valve stem 406 so that the valve member 404 and the first sealing element 408 are displaced in response to the displacement of the armature 418. For example, when the armature is in the first position of FIG. 4A, the valve member 404 and the first sealing element 408 are in the corresponding first valve position. When the armature 418 is in the second position of FIG. 4B, the valve stem 406 and the first sealing element 408 are displaced to the corresponding second valve position.

The coil 420 in the solenoid 416 is electrically coupled to a power source (not shown) through a connector 422 for providing a selectable electrical signal, such as a current, to the coil 420. The armature 418 is movable in response to a current applied to the coil 420. A first electrical signal and a second electrical signal are provided to the coil 212 corresponding to a first energy condition and a second energy condition, respectively. For example, the first electrical signal may be a zero ampere current corresponding to a de-energized (or default) solenoid condition and the second electrical signal may correspond to a greater, or non-zero ampere, current corresponding to an energized solenoid condition. The first energy condition moves the armature to a first position corresponding to the first valve position (FIG. 4A) and the second energy condition moves the armature to a second position corresponding to the second valve position (FIG. 4B).

Figure 5A:
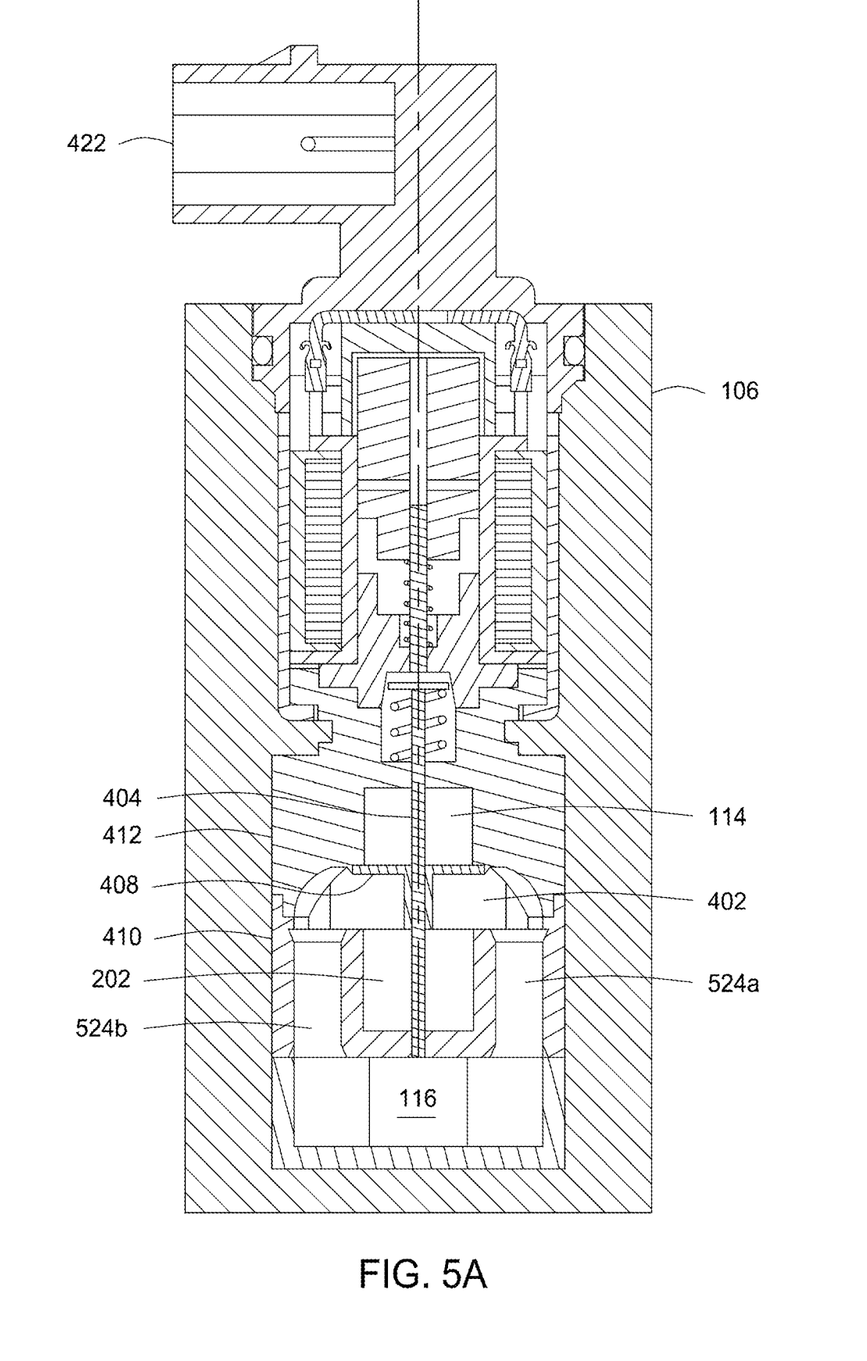
FIG. 5A is a sectional view of the combination thermal management valve of FIG. 1 taken along line V-V in a first position.
Figure 5B:
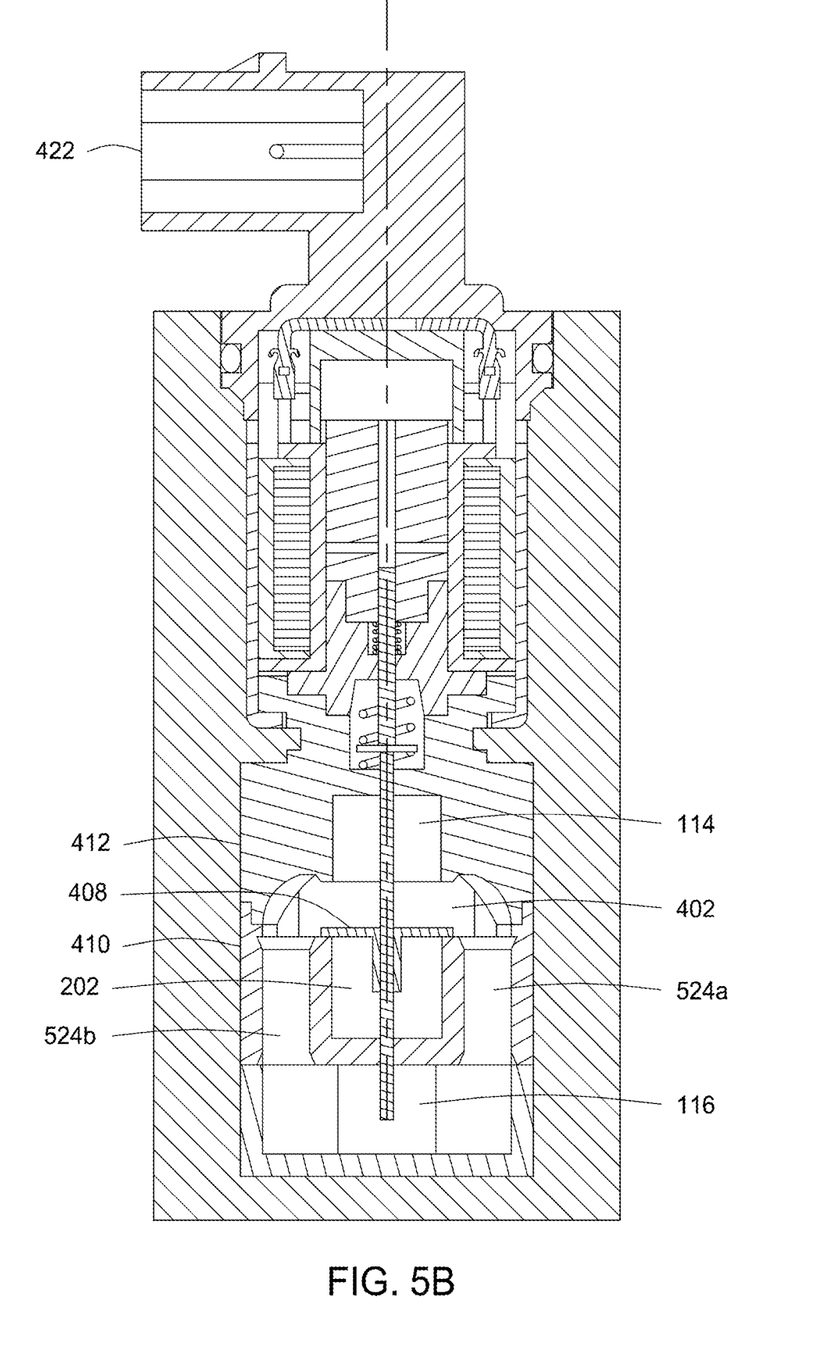
FIG. 5B is a sectional view of the combination thermal management valve of FIG. 1 taken along line V-V in a second position.
Figure 6:
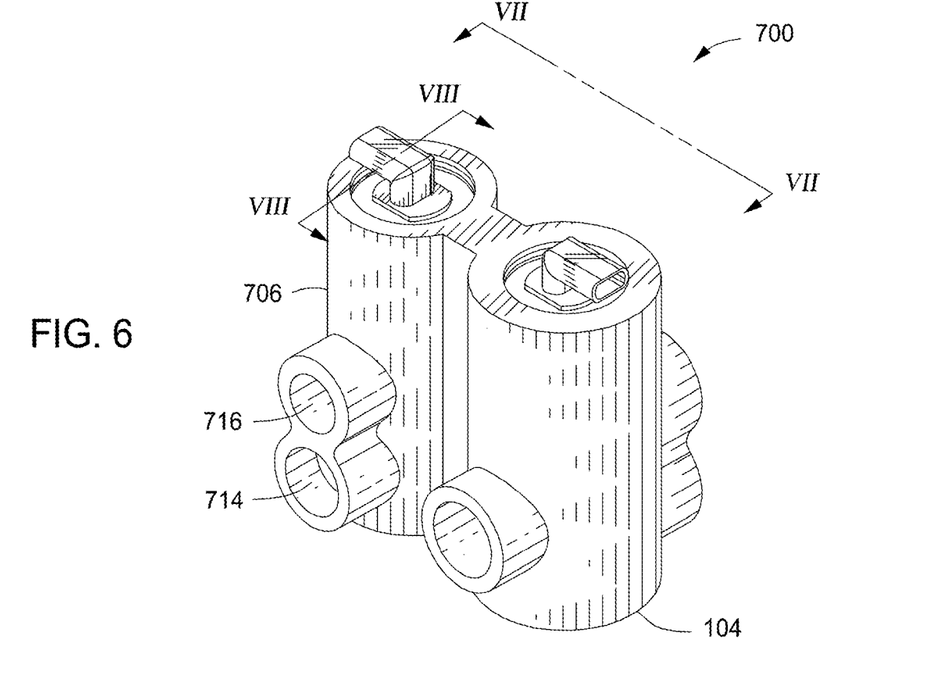
FIG. 6 is a perspective view of a combination thermal management valve in accordance with an embodiment of the present invention.
Figure 7:
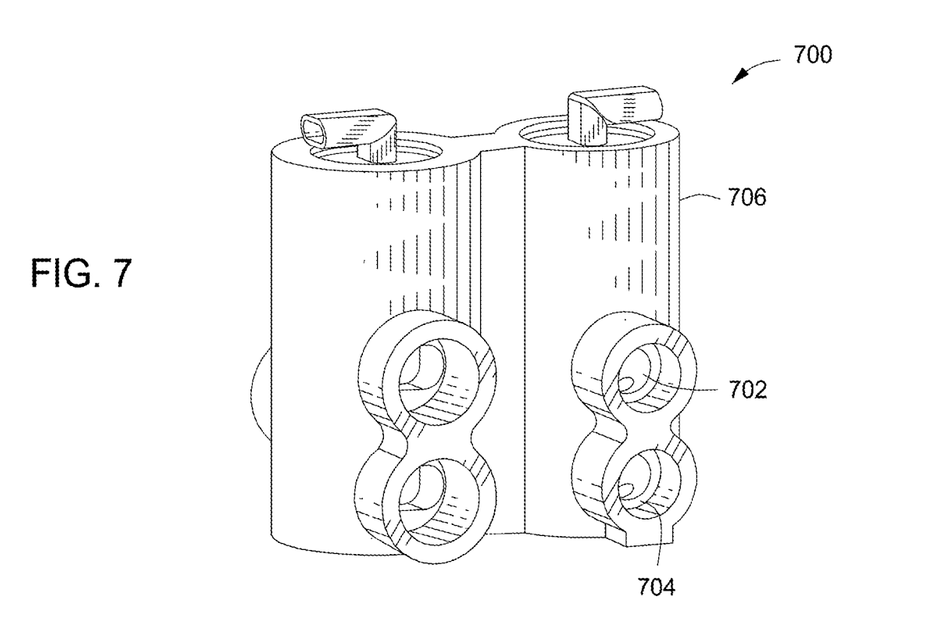
FIG. 7 is a perspective view of the combination thermal management valve of FIG. 6 taken along VII-VII.

FIGS. 5A and 5B correspond with the embodiment of FIGS. 4A and 4B in a view taken along line V-V (FIG. 4A) and are illustrative of the cooperation of the first and second valve bodies 410, 412 in an embodiment of the present invention. As illustrated, the first valve body 410 includes outlet passages 524a and 524b, collectively outlet 524, formed through a lower portion of the first valve body 410. Two passages, 524a and 524b, are illustrated, although one passage or more than two passages may be used without departing from the scope of the invention.

As illustrated in FIG. 5A, the first sealing element 408 is abutting against a portion of the second valve body 412, closing the second inlet 114 to fluid communication with the second outlet 116. In the position of FIG. 5A, the third inlet 202 is open to fluid communication with the second outlet 116 through second passage 402.

With the valve member 404 in the second element position of FIG. 5B, the sealing element 408 abuts a portion of the first valve body 410 and closes the third inlet 202 from fluid communication with the second outlet 116. As illustrated in FIG. 5B, the second inlet 114 is open to fluid communication with the second outlet 116 through second passage 402.

In a non-limiting embodiment of the present invention illustrated in FIGS. 6 through 8B, a thermal management valve 700 has a first valve chamber 104 as described above and a second valve chamber 706. The second valve chamber 706 includes a second inlet 714, a third inlet 702, a second outlet 716, and a fourth outlet 704. The second inlet 714, third inlet 702, second outlet 716 and the fourth outlet 704 are in controlled fluid communication through passage 806.

Figure 8A:
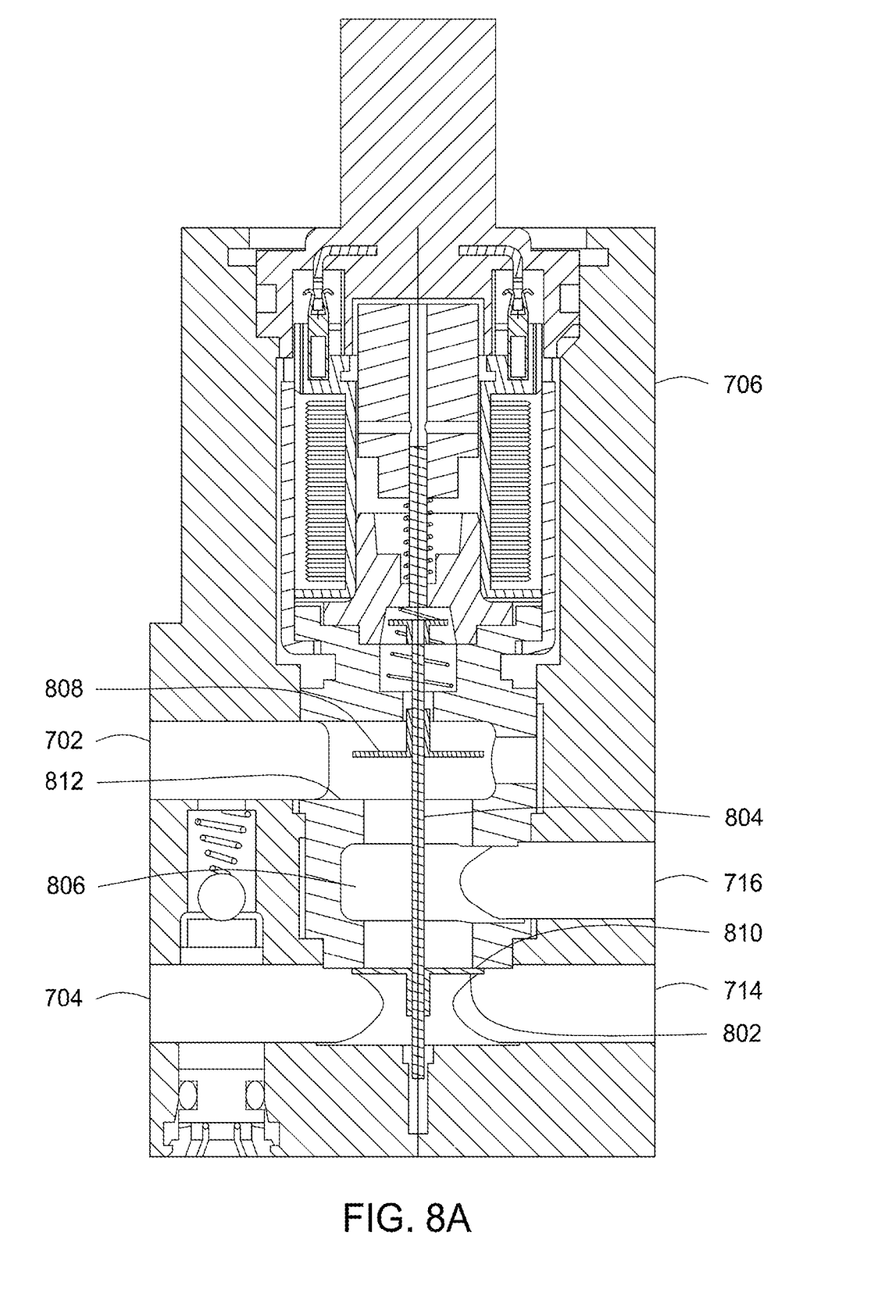
FIG. 8A is a sectional view of the combination thermal management valve of FIG. 7 taken along line VIII-VIII in a second position.
Figure 8B:
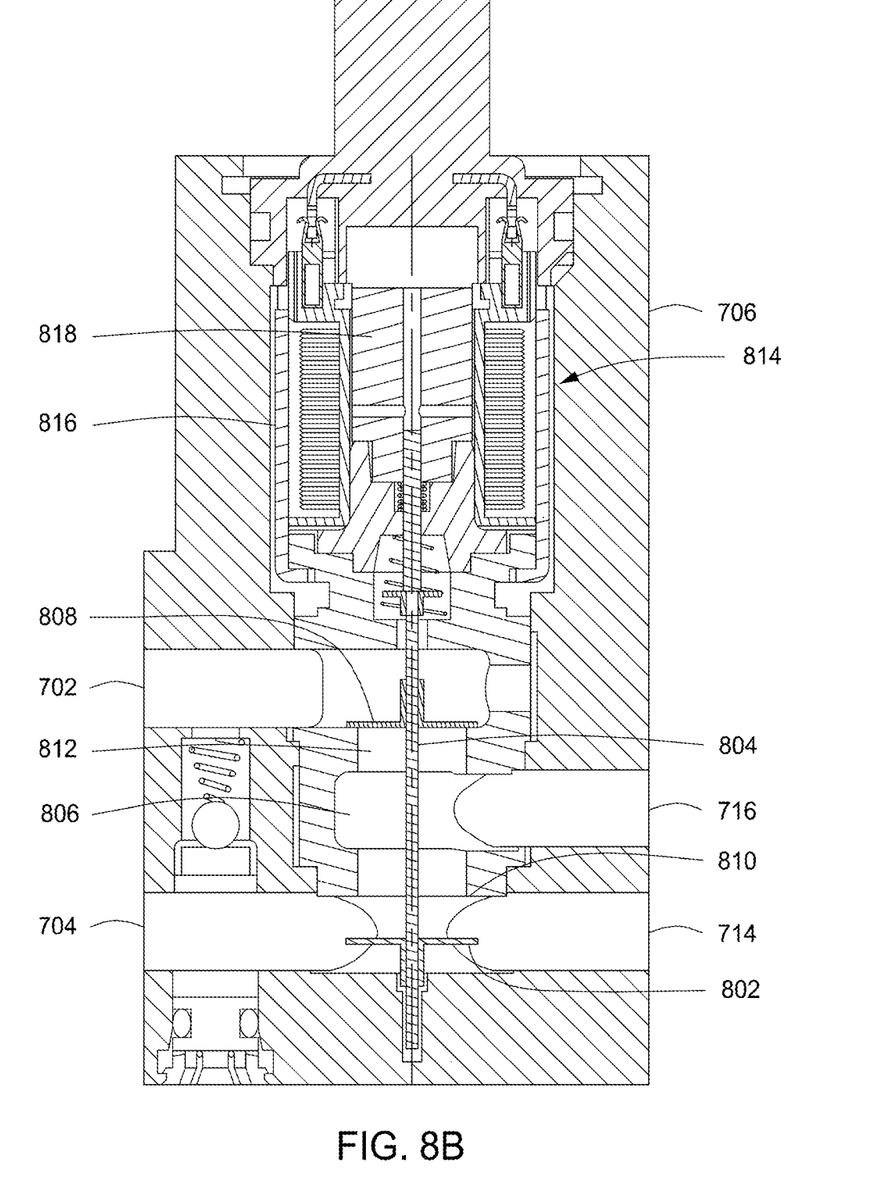
FIG. 8B is a sectional view of the combination thermal management valve of FIG. 7 taken along line VIII-VIII in a first position.

As illustrated in FIGS. 8A, 8B, a first sealing element 802 is disposed on a portion of the valve stem 804 between the second inlet 714, the fourth outlet 704, and the passage 806 leading to the second outlet 716. A second sealing element 808 is disposed on a portion of the valve stem 804 between the third inlet 702 and the passage 806 leading to the second outlet 716. The first and second sealing elements 802, 808 are supported on the valve stem 804 for coordinated movement between a first element position (FIG. 8A) and a second element position (FIG. 8B).

In the first element position of FIG. 8B, the first sealing element 802 is spaced apart from the lower end 810 of the passage 806 and opens the second inlet 714 to fluid communication with the second outlet 716 and the fourth outlet 704. The second sealing element 808 abuts the upper end 812 of the passage 806 and closes the third inlet 702 to fluid communication with the passage 806 and the second outlet 716.

In the second element position of FIG. 8A, the first sealing element 802 abuts the lower end 810 of the passage 806 and closes the second inlet 714 and the fourth outlet 704 to fluid communication with the second outlet 716. The second sealing element 808 is spaced apart from the upper end 812 of the passage 806 and opens the third inlet 702 to fluid communication with the second outlet 716 through the passage 806.

For ease of illustration only, the first and second sealing element 802, 808 are depicted as disks having upper and lower flat surfaces to selectively open or close flow paths including the second outlet 716. Other suitable shapes for the contact surfaces include, but are not limited to, conical and spherical surfaces.

As illustrated in FIGS. 8A and 8B, the valve stem 804 is coupled to an actuator 814. In the non-limiting embodiment illustrated, the actuator 814 includes a solenoid 816 having a movable armature 818 supported for linear displacement between at least the first position of FIG. 8B and a second position of FIG. 8A. The actuator 814 functions as described above with respect to the embodiment of FIGS. 4A and 4B to displace the first and second sealing elements 802, 808, respectively.

For ease of description, the non-limiting embodiments disclosed herein comprise two valve assemblies of different construction capable of managing the flow of two heat transfer media. Combination thermal management valves having more than two valve assemblies for managing the flow of two or more heat transfer media are within the scope and spirit of this invention. The disclosed combination thermal management valve may include two or more valve assemblies of similar construction, or of the same construction, within the scope and spirit of the present invention.

Thus embodiments of a combination thermal management valve are provided herein. In the non-limiting embodiments illustrated in the figures, the first valve assembly may be suitable for a fluid flow with a high flow rate and a low pressure drop across the valve, for example a water-based heat transfer medium. The second valve assembly may be suitable for a high pressure flow in which a pressure drop across the valve is acceptable, such as an oil-based heat transfer medium. The inventive combination thermal management valve may advantageously reduce the number of valve bodies necessary to manage the thermal management requirements of an automobile. Accordingly, the assembly cost and the difficulty in routing conduit for thermal media may be advantageously reduced in applications employing the present invention.

What is claimed is:

1. A combination thermal management valve comprising: a module including: a first valve chamber comprising a first inlet in controlled fluid communication with a first outlet via a first passage; and a second valve chamber, fluidly isolated from the first valve chamber, comprising a second inlet, a third inlet, a second outlet in controlled fluid communication with each other via a second passage; a first valve assembly disposed in the first valve chamber including a sealing disk disposed within the passage and supported for displacement between a first disk position that opens the first inlet to fluid communication with the first outlet and a second disk position that closes the first inlet to fluid communication with the first outlet, wherein the sealing disk is supported for angular displacement about an axis of rotation through the sealing disk; and a second valve assembly disposed in the second valve chamber including a first sealing element movable between a first element position that closes the second inlet to fluid communication with the second outlet and a second element position that opens the second inlet to fluid communication with the second outlet; the combination thermal management valve further comprising: a valve stem supporting the first sealing element for linear displacement between the first element position and the second element position.

2. The valve of claim 1, further comprising an actuator linked to the sealing disk at a connection point offset from the axis of rotation so that the sealing disk rotates about the axis of rotation from the first disk position to the second disk position in reaction to a displacement of the actuator from a first actuator position to a second actuator position.

3. The valve of claim 2, wherein the actuator is a solenoid having an armature linked to the sealing disk wherein the first disk position corresponds to a first energy condition of the solenoid and the second disk position corresponds to a second energy condition of the solenoid.

4. The valve of claim 1, wherein the first valve chamber further comprises a third outlet in fluid communication with the passage, wherein the first disk position closes the inlet to fluid communication with third outlet and the second position opens the inlet to fluid communication with the third outlet.

5. The valve of claim 4, further comprising a third disk position at least partially opening the first inlet to fluid communication with the first outlet and the third outlet.

6. The valve of claim 1, wherein the first disk position opens the third inlet to fluid communication with the second outlet and the second disk position closes the third inlet to fluid communication with the second outlet.

7. The valve of claim 1, further comprising an actuator having an armature coupled to the valve stem, the armature supported for displacement between a first actuator position and a second actuator position.

8. The valve of claim 7, wherein the actuator is a solenoid.

9. The valve of claim 8, wherein the first actuator position corresponds to a first energy condition of the solenoid and the second actuator position corresponds to a second energy condition of the solenoid.

10. The valve of claim 7, wherein the first actuator position corresponds with the first element position and the second armature position corresponds to the second element position.

11. The valve of claim 1, further comprising:
a second sealing element; and
a valve stem supporting the first sealing element and the second sealing element for coordinated movement between the first element position and the second element position,
wherein in the first element position the second sealing element opens the third inlet to fluid communication with the second outlet and in the second element position the second sealing element seals the third inlet to fluid communication with the second outlet.

12. The valve of claim 11, further comprising an actuator having an armature coupled to the valve stem, the armature supported for displacement between a first actuator position and a second actuator position.

13. The valve of claim 12, wherein the actuator is a solenoid.

14. The valve of claim 13, wherein the first actuator position corresponds to a first energy condition of the solenoid and the second actuator position corresponds to a second energy condition of the solenoid.

15. A valve assembly including: a first valve chamber comprising a first inlet in fluid communication with a first outlet via a passage and a third outlet via the passage; a first valve assembly disposed in the first valve chamber including a sealing disk disposed within the passage and supported for angular displacement about an axis through the sealing disk between a first disk position that opens the first inlet to fluid communication with the first outlet and closes the first inlet to fluid communication with the third outlet and a second disk position that closes the first inlet to fluid communication with the first outlet and opens the first inlet to communication with the third outlet; and a second valve chamber, fluidly isolated from the first valve chamber, in fluid communication with a second inlet, a third inlet, a second outlet; a second valve assembly disposed in the second valve chamber including a first sealing element supported on a stem and linearly movable between a first element position that closes the second inlet to fluid communication with the second outlet and opens the third inlet to fluid communication with the second outlet and a second element position that opens the second inlet to fluid communication with the second outlet and closes the third inlet from fluid communication with the second outlet, wherein the first and second disk positions and the first and second element positions are independently controlled.

16. The valve assembly of claim 15, further comprising:
a first solenoid; and
a second solenoid,
wherein an armature of the first solenoid is coupled to the sealing disk so that a displacement of the armature produces a corresponding angular displacement of the sealing disk and an armature of the second solenoid is coupled to the first sealing element so that a displacement of the armature produces a corresponding movement of the first sealing element.

17. The valve assembly of claim 16, further comprising:
a second sealing element; and
a valve stem supporting the first sealing element and the second sealing element for coordinated movement between the first element position and the second element position,
wherein in the first element position the second sealing element opens the third inlet to fluid communication with the second outlet and in the second element position the second sealing element seals the third inlet to fluid communication with the second outlet.

* * * * *